United States Patent [19]

Vaseen

[11] 4,252,623
[45] Feb. 24, 1981

[54] OZONE PRODUCTION VIA LASER LIGHT ENERGY

[76] Inventor: Vesper A. Vaseen, 9840 W. 35th Ave., Wheatridge, Colo. 80033

[21] Appl. No.: 81,477

[22] Filed: Oct. 3, 1979

[51] Int. Cl.³ .......................... B01J 19/08; B01J 19/26
[52] U.S. Cl. ...................... 204/157.1 R; 204/157.1 H
[58] Field of Search .............. 204/157.1 R, DIG. 11; 250/527

[56] References Cited

U.S. PATENT DOCUMENTS

| | | | |
|---|---|---|---|
| 4,131,528 | 12/1978 | Tsujimoto et al. | 204/157.1 R |
| 4,176,024 | 11/1979 | Garbuny | 204/157.1 R |
| 4,189,363 | 2/1980 | Beitzel | 204/157.1 R |

*Primary Examiner*—Howard S. Williams

[57] ABSTRACT

My invention relates to the use of laser light energy to excite oxygen from its normal ambient state to that required for it to convert to molecular ozone. Laser light energy is passed through a flowing stream of oxygen molecules and atoms, either when the oxygen is in a gaseous form or as when it is absorbed as a gas in a halogenated hydrocarbon inert liquid; thus producing ozone, when in the gaseous form, for immediate use, or when absorbed in the inert liquid, for later use.

4 Claims, 2 Drawing Figures

OZONE PRODUCTION VIA LASER LIGHT ENERGY

BACKGROUND OF THE INVENTION

1. Field of the Invention

Ozone has been called "mother nature's effluent treatment". Ozone ($O_3$) has been used throughout Europe to disinfect and improve the quality of drinking water since 1906: When the first commercial plant for an application of this sort began operating at Nice, France. Several thousand installations are now in operation, the most of which are in Europe. Ozone is used principally in water treatment for taste and odor enhancement. Present day demands for cleaner effluent streams from Industrial Plants, along with simpler, more efficient means of treating municipal sewage indicate the much greater use of ozone, if its cost of production can be kept competitive with chlorine, chlorine dioxide, peroxide, and permanganate.

The more recent findings that chlorinated water may produce carcinogens with trace hydrocarbons is a further reason to expand the use of ozone as a disinfectant and sterilant.

2. Description of Prior Art

The basic elements of older ozonation systems are an ozone generator and a mixing tank or column.

The heart of the generator is the ozone producer consisting of a pair of large-area electrodes, either flat or concentric tubular, separated by an air gap and a presence of a high-voltage, high frequency silent electric discharge, or corona, ozone is generated from oxygen in the gap between the electrodes. Most generating units are designed to operate in the 5000 to 25,000 volt range, and at frequencies up to 1000, or more $H_z$.

Many of the operating problems encountered in this type equipment is the heat in the generating area, along with accumulations of nitric acid and nitrogen oxides which occur as by-products of ozone generation from air having a dew point above $-40°$ C. Use of air not only requires drying prior to introduction to the generator, but decreases the oxygen conversion to ozone to 50% of that produced when pure oxygen is used.

Several improvements have been developed in the generation of ozone. Acid-resistant materials have reduced the need for dry air; and electronic circuitry has been fruitful in the design and use of "tuned" circuits that is—spaced or shaped surges of power set resonant circuits "ringing" with a series of descending electronic echoes that maintain the corona at an ozone generating energy level between pulses. This form of electronic coasting has significantly reduced power consumption. Power consumption of 20 watts per gram of ozone has been reduced to 10+.

The most recent being the production of ozone by converting oxygen, absorbed in a liquid dielectric, with either a corona, using the liquid as the dielectric, or ultra violet light irradiation.

| U.S. Pat. Nos. | | | |
|---|---|---|---|
| 1,074,106 | 9/1913 | Dumars | 204/176 |
| 2,992,540 | 7/1961 | Grosse et al | 62/48 |
| 3,186,930 | 6/1965 | Cook | 204/176 |
| 3,342,721 | 9/1967 | Debelius et al | 250/531 |
| 3,766,051 | 10/1973 | Bollyky | 250/540 |
| 4,140,608 | 2/1979 | Vaseen | 204/176 |
| U.S. Patent Applications - | No. 885,956 - 3/13/78 | | |

| -continued | |
|---|---|
| U.S. Pat. Nos. | |
| | No. 044,963 - 6/4/79 |

SUMMARY OF INVENTION

The invention is based on two methods of introducing the laser light energy to the oxygen molecules and atoms. The first method is the use of gaseous oxygen for the production of ozone which is used as fast as possible and immediately following its production. The second method is the use of a fully halogenated hydrocarbon, inert, dielectric liquid which, preferably under superatmospheric pressure, is saturated with preferably oxygen gas or air; thus producing ozone absorbed in the liquid from which it is released for use up to 3 days (half life) later. The ozone produced in the gaseous oxygen stream although producing, with sufficient laser energy, up to 99.9% ozone at moment of laser energy contact with 3 adjacent oxygen molecules; is short lived due to heat of laser energy beam; therefore, the product stream is preferably planned to produce only 5% to 30% Ozone produced in the inert liquid stream is not vulnerable to heat degredation, as the excess heat is absorbed in the liquid; thus is more efficient of power use. Preferably the ozone production is controlled by laser energy imposed to less than 30% ozone and 70% oxygen, as absorbed in the inert liquid.

The laser energized gaseous ozonator is preferably a single diameter Venturi configuration ejector (1). The oxygen gas or air as injected through the ejector at a flow rate and velocity which according to Bernoulli's theorem, when flowing through the throat (4) of the Venturi section preferably produces a "head" or pressure which permits the orifice or window (8) to be open. If a velocity-pressure system is used where the throat pressure is either less than or greater than the exterior pressure of the unit, then an infrared insensitive lens must be used as the window. The high intensity laser beam (6) (7) is projected through the window (8) with a light energy beam (7), preferably of the same diameter as the throat section (4), thus fully intersecting 100% of the oxygen gas stream (1) moving through the ejector, Venturi throat section, and converting the oxygen atoms and molecules to ozone according to the formula: $3O_2 + $ laser energy $= 2O_3$. The immediate enpansion of the throat section (4) to an increased diameter (5) cools the heating effect produced by the laser energy and thus inhibits the rapid deterioration of ozone back to oxygen. The efficiency of use of laser energy is enhanced by producing a reflective surface (9) on the interior throat surfaces of the Venturi throat section (4). The ozone and oxygen gas mixture is due to the direct energy excitation by the laser beam able to be controlled to produce from 0.01% to 99.9% ozone, but, preferably is controlled to produce from 5% to 30% ozone. Ozone has a very short life as a gas, therefore, it is preferred ozone produced as a gas be used immediately as produced.

The laser energized liquid ozonator is preferably a double diameter (4) (12) Venturi throat configuration ejector (1). The inert liquid use for the absorber is a dielectric halogenated hydrocarbon, preferably a fully fluoridated hydrocarbon with (8) eight or more carbon atoms. The liquid dielectric (2) is injected into the injector (1) with a flow and pressure designed and controlled by valve (10) along with the diameter of the injector throat diameter (4) to provide a mixing of the gaseous oxygen (14) whose flow rate and pressure are controlled by rate of flow and pressure control valve (15). The preferably, supersaturated absorber liquid, now pregnant with oxygen flows through the laser beam (7) from laser generator (6) which is beamed through the orifice or window (8) through the inert liquid. Preferably the light beam of laser energy is the same diameter as the throat of the injector (1) thereby direct contacting and energizing 100% of the oxygen atoms and molecules. The inside of the injector throat at the laser beam receipt is preferably reflector lined (9) so as to reflect into the liquid stream the total energy received from the laser generator. The absorber liquid, now pregnant with from 0.01% to 99.9% ozone, depending on amount of laser energy introduced to the liquid at window (8) is removed through an increased diameter (5) of the injector to use. Preferably this entire operation is carried out under superatmospheric pressure, thereby making it easy to obtain the ozone gas by reducing the pressure on the liquid. With a pressurized system the hydraulics of the system, if they produce a positive pressure at orifice or window (8), then requires it be a lens of insensitive to infrared material.

DESCRIPTION OF PREFERRED EMBODIMENTS

OZONE

Figure 1:
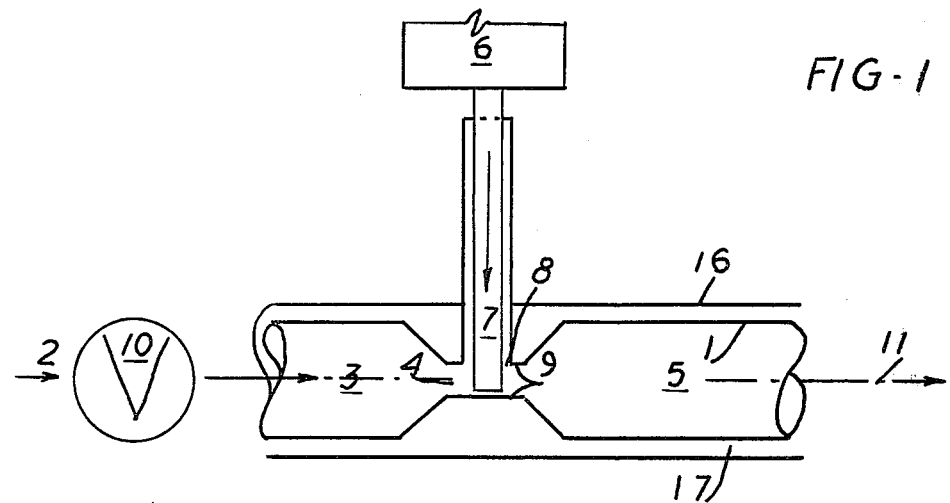
FIG. 1 is an ejector type apparatus for producing ozone from a gaseous source.
Figure 2:
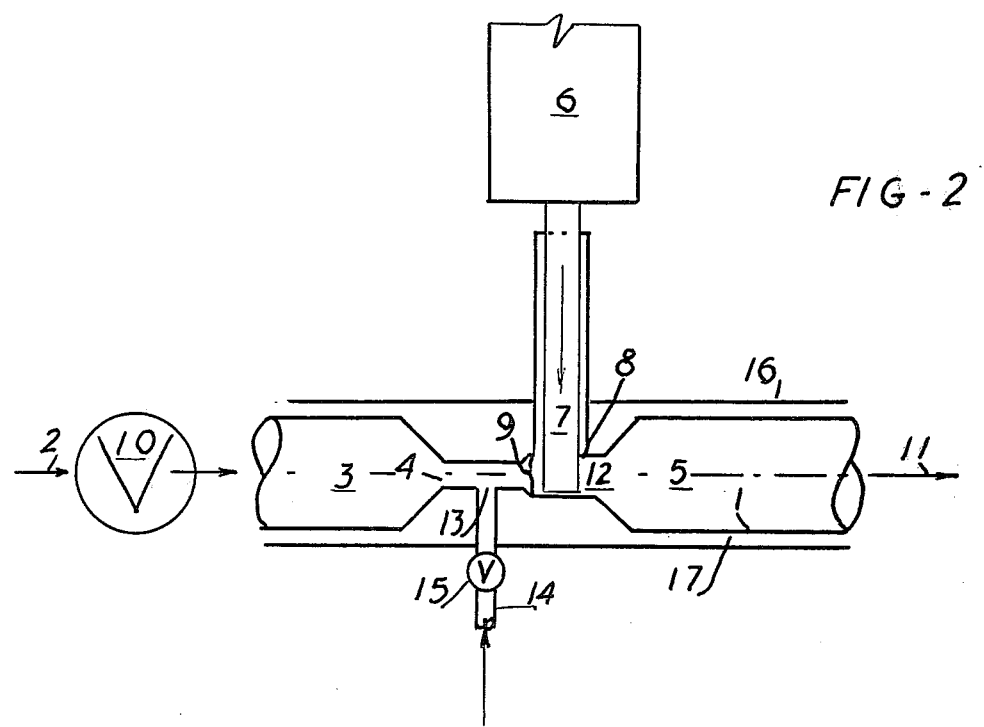
FIG. 2 is an ejector type apparatus for producing ozone from an absorber liquid.

Pure ozone is a toxic, bluish, unstable, potentially explosive gas or under refrigeration a dark blue liquid. The chemical/physical characteristics are:

| PHYSICAL CONSTANTS | |
|---|---|
| (Formula $O_3$) | |
| Molecular Weight | 47.9982 |
| Boiling point at 1 atm. | $-169.4°$ F. ($-111.9°$ C.) |
| Freezing point at 1 atm. | $-314.5°$ F. ($-.192.5°$ C.) |
| Density, Gas at 0° C., 1 atm. | 2.143 g/ml. |
| Density, Liquid at $-183°$ C. | 1.571 g/ml. |
| Critical Temperature | 10.2° F. ($-12.1°$ C.) |
| Critical Pressure | 802.5 p.s.i.a. (54.6 atm) (56.4 kg/cm.$^2$ absolute) |
| Viscosity, Liquid at $-183°$ C. | 1.57 centipoises |
| Latent Heat of Vaporization at b.p. | 3410 kcal/mole |
| Surface Tension at $-183°$ C. | 38.4 dynes/cm |
| Dielectric Constant, Liquid at $-183°$ C. | 4.79 |
| Dipole Moment | 0.55 D |
| Solubility in Water at 0° C., 1 atm. | 0.494 volume/volume water |

At the present time ozone is supplied dissolved in chlorotrifluoromethane (Freon 13) in stainless steel cylinders. These solutions can be handled safely at vapor phase concentrations up to 20% by volume of ozone. The cylinder pressure is about 475 p.s.i.g. at 20° C. and about 110 p.s.i.g. at $-60°$ C.

Ozone can be supplied dissolved in a Freon 13 solvent with an initial concentration of 50 liters of gaseous ozone (at S.T.P.) per liter of solution. The solution contain trace amounts of oxygen, which accumulate slowly with ozone decomposition.

HANDLING AND STORAGE

Ozone is supplied to users dissolved in "Freon 13" which decreases, the hazards of handling and using the gas. Since ozone is a gas which has a tendency to decompose, it is essential that the container be stored at low temperatures to decrease the amount of decomposition. To effect this low temperature storage during delivery the cylinder is packed with dry ice in an insulated container which is capable of maintaining low temperatures for approximately 5 days.

Upon receipt of the ozone package it is recommended that a fresh charge of dry ice be put around the cylinder and the unit recharged periodically until the ozone has been expanded or the experiment completed. The ozone cylinder can also be stored in a laboratory deep freeze or dry ice chest.

NOTE: Permitting the ozone to warm up unnecessarily is not a hazard, but will only result in a more rapid decomposition of the ozone, with the half-life being about 3 days.

| Temperature | Approximate Half-Life of Ozone |
|---|---|
| 20° C. | 3 days |
| $-15°$ C. | 8 days |
| $-25°$ C. | 18 days |
| $-50°$ C. | 3 months |

MATERIALS OF CONSTRUCTION

The preferred materials of construction are: glass, stainless steel, Teflon, Del-F, viton or hypalon, aluminum, tygon, polyvinyl chloride, and polyethylene. The use of copper and copper alloys should be avoided because these materials act as a catalyst to promote decomposition. Rubber or any composition thereof is unsuitable. Extreme precaution should be taken to avoid contact with oil, grease or other readily combustible substances.

COMMERCIAL PREPARATION

Ozone is produced by passing a stream of oxygen or air through a generator in which it is subjected to an electrical discharge.

MOLECULAR STRUCTURE

The ozone molecular is angular, with an O—O—O— angle of 116° 49'±30' and O—O bond distances of 1.278±0.003 A. The structure involves reasonance among the four structures shown, the first two predominating.

CHEMICAL PROPERTIES

Ozone is second only to fluorine in its oxidizing power. It oxidizes most inorganic compounds to their final oxidative state. For example, ferrous, manganous, and chromous ions are oxidized quantitatively to their respective highest states of oxidation. The addition of ozone to an ethylenic double bond followed by decomposition of the resulting ozonide has long been recognized as the most reliable laboratory procedure for oxidative cleavage, permitting location of the double bond.

As a method of cleavage, the above ozonolysis has the important advantage in that it permits isolation of the primary cleavage products, since the oxidant (ozone) can be removed before the ozonide is cleaved.

Ozonolysis has been extensively used in the laboratory for structural analysis and has also found commercial application for the production of aldehydes and acids. The application of this method has been limited to some extent by the fact that many ozonides are explosive. Explosions can usually be avoided by working at low temperatures (in solvents such as chlorofluoromethane or ethanes, ethyl acetate, carbon tetrachloride, or ethyl chloride) and carrying out the ozonide formation and decompositions in solution, without attempting to isolate the ozonide itself.

INDUSTRIAL ZONE

Industrial zone is usually not generated, dissolved in a solvent as above and chilled till use, but rather is an unstable gas considerably diluted with air or oxygen. From a practical standpoint, it is uneconomical or hazardous to concentrate, ship, and store; it should be produced and used as needed. The most economical means of producing ozone in quantity is by passing air or oxygen through a high voltage electrical discharge in a machine called an ozonator. Ozone can be generated from air or oxygen.

However, most ozonators will yield much more ozone when fed with oxygen.

Within limits the concentration of ozone (Normally 1 or 2%) can be increased by simply reducing the gas flow through the ozonator, unfortunately, this is accomplished at the cost of a loss in over-all production. The higher one tries to make the ozone concentration, the less ozone one gets per hour from the ozonator. Ozone concentrations of 5% (in air) or 10% (in oxygen) are possible but usually are uneconomical. The yield drops to zero slightly above these limits. The explanation is that the electric discharge not only produces ozone

$$3O_2 \rightarrow 2O_3$$

but also can destroy it

$$2O_3 \rightarrow 3O_2$$

the velocity of the reverse reaction increasing with the ozone concentration

DIELECTRIC LIQUID

The dielectric liquids must have certain physical/chemical characteristics in general as follows:
1. Boiling points in excess of 100° C. (212° F.)
2. Low vapor pressures—non volatile
3. Specific heat capacities greater than 0.20.
4. Superatmospheric critical pressures
5. Non-miscible with water
6. Non toxic to organic life
7. Stable chemical/physical properties
8. Reusable for inumerable cycles
9. Non-biodegradable
10. Non flammable—no flash point
11. Affinity for dissolving oxygen Of the many dielectric liquids which meet these general conditions, the olyorganosiloxanes and fluorocarbons, in particular, are recommended.

Fluorocarbons are easily made by the reaction of carbon with fluorine.

Removal of hydrogen atoms from the carbon skeleton, either singly or in pairs, is much more easily accomplished than the removal of fluorine atoms. This is a partial explanation of the failure of fluorocarbons to take part in organic chemical reactions. The almost perfect covering power of the fluorine atoms for the carbon skeleton protects the internal force fields and necessitates a much higher energy of activation to initiate reaction for the fluorocarbons than for hydrocarbons.

Most liquid fluorocarbons, with eight (8) or more carbon atoms, can be used to absorb or dissolve air or oxygen for use in production of ozone. Certain liquid fluorocarbons are more usable than others depending on the particular separation and process operation which takes into account—absorbent capacities, boiling points, critical points, viscosity, and other physical/chemical characteristics of the absorbent.

Preferably the absorber liquid is a fully fluorinated hydrocarbon, such as $C_{10}F_8$.

LASER ENERGY

The laser, by definition, is a device that amplifies light by means of stimulated emission of radiation. In practice, a laser is generally used as a source or generator of radiation. The laser is a device which produces an intense, highly directional beam of light of a very pure color.

The laser beam also possesses the property of coherence; that is, regularity of the waves in the beam.

Extremely high intensity laser beams can be produced either as continuous sources of beam energy or in the form of flashes of very short duration.

Either beam type is applicable to this invention. Preferably, the beam is continuous, but if flashes are of short enough interval between flashes as to efficiently excite the oxygen atoms and molecules, then the intermittant laser forms are used.

Laser energy output varies with the gas, liquid or solid used as the generator to produce it, along with their general design configurations and type of light source. The laser selected should produce a high power output.

Those familiar with use of lasers will have no difficulty selecting, gas, liquid, or solid generator types, and designing for power output required for throat cross section area coverage, with power availability ranging from 1 KWH to 5 KWH per pound of 20% ozone.

EXAMPLE NO. 1

The art and science of producing ozone from oxygen (or air) if best taught by way of example. For example, a ¾ inch injector (1) is selected with a capacity for moving 0.28 pounds of oxygen gas (2) through it per minute of time, when the gas is introduced to the ¾" inlet at 12 psi and at 60° F. the ejector throat (4) is designed to increase the velocity and thus reduce the pressure to atmospheric allowing—"window" (8) for the introduction of the laser beam energy, at 90° to the direction of the gas flow. With a throat diameter (4) of, for example of 3/16", the laser generator (6) is selected which preferably produces a 3/16" diameter beam (7). The energy requirement to produce 20% ozone or 0.056 pounds of ozone and 0.225 pounds of oxygen is for example, a laser output energy of 14.05 KWHRS. The excess energy provided over that required for oxygen conversion to ozone is transferred to the gases as heat at the rate of, for example, 115 BTU/minute. Preferably, this heat is removed at the ejector/ozonator (1) by cooling fluid

(17) circulated around the unit in the retaining jacket (16).

EXAMPLE NO. 2

For example, a ¾" ejector (1) is selected with a capacity for processing 7.25 GPM of an inert, dielectric liquid (2) such as $C_{10}H_8$, when the ejector/ozonator is accepting at the first throat restriction (4) which by way of example is 3/16" in diameter, 0.343 pounds of oxygen gas (14) at 60° F. The secondary throat (12) is increased to ¼" diameter for example where a ¼ inch diameter laser beam (7) is introduced through the atmospheric (head) pressure neutral "Window" (8) or lens, at 90° to the direction of flow of the liquid. The laser generator (6) is selected which preferably produces a ¼" diameter beam (7) the energy requirement to produce 20% ozone or 0.0680 pounds of ozone and 0.2750 pounds of oxygen is for example, a laser energy output of 17.2 KWHR. The excess energy supplied over that required for oxygen conversion to ozone is transferred to the inert liquid as heat at the rate of 141 BTU/Min. The inert liquid has a heat absorptive capacity which, for example raises the temperature of the liquid 8° F. Preferably, this heat is absorbed within cooling jacket (16) on the ejector/ozonator, through which a cooling heat exchanger fluid (17) is recirculated.

Those familiar with pneumatic and hydraulic design will have no difficulty in designing or selecting the ejector/ozonator configuration required for both quantity flow of oxygen and quantity flow of inert, dielectric absorber liquid.

Similarly, those familiar with laser generators will have no difficulty in selecting the solid state, liquid state or gaseous state generator which has the output power capacity to excite the weight of oxygen introduced to weight of ozone desired. Preferably the throat circumference of the ejector is highly reflective; thereby returning unused laser energy to the fluid stream passing through the throat.

Preferably the ejector/ozonator is pneumatically and/or hydraulically designed as to permit an open "window" (8) for the introduction of the laser beam (7) to the fluid flow (2) when pressure and velocity factors inhibit this design, then a lens (8) of preferably an infrared nonsusceptible material is used as the window.

The method of converting oxygen absorbed in a dielectric liquid to ozone, heretofore presented, also explained and described as an apparatus, has been by way of example; and not to infer these descriptions and capacities cannot be altered to suit individual design configurations and desired ozone quantities and qualities. The rates of flow, quantity of materials, and quality of materials, along with apparatus configurations can be changed without altering the spirit of the disclosure and invention.

What is claimed:

1. A method for generating ozone by conversion of oxygen with laser light energy excitation of the oxygen to ozone comprising the steps of:
   selecting an inert dielectric liquid not chemically reactive with ozone;
   injecting said liquid under superatmospheric pressure through a venturi type injector, thereby causing oxygen to be received through an entry nozzle directly into the venturi throat area and mixing with the inert liquid where it is absorbed;
   projecting a beam of laser light energy into the venturi throat area into the liquid pregnant with absorbed oxygen, thus converting a part of the absorbed oxygen to absorbed zone, and causing the laser light energy to be reflected back into the liquid for greater efficiency.

2. The method of claim 1 wherein a cooling fluid is circulated for temperature control of the liquid.

3. The method of claim 1 wherein the ozone and unconverted oxygen are recovered by lowering the superatmospheric pressure of the liquid to atmospheric or subatmospheric pressure.

4. The process of claim 10 wherein air is absorbed as the source of the oxygen.

* * * * *